United States Patent [19]
Klak et al.

[11] 4,413,606
[45] Nov. 8, 1983

[54] HEATING DEVICE FOR PREHEATING COMBUSTION AIR FOR AN INTERNAL COMBUSTION ENGINE

[75] Inventors: Roland Klak, Ostfildern; Gerhard Fränkle, Remshalden; Dieter Woschée, Esslingen, all of Fed. Rep. of Germany

[73] Assignee: Daimler-Benz Aktiengesellschaft, Stuttgart, Fed. Rep. of Germany

[21] Appl. No.: 316,532

[22] Filed: Oct. 29, 1981

[30] Foreign Application Priority Data

Oct. 29, 1980 [DE] Fed. Rep. of Germany ....... 3040720
Dec. 24, 1980 [DE] Fed. Rep. of Germany ....... 3049095

[51] Int. Cl.3 ...................... F02M 31/04; F03D 11/02
[52] U.S. Cl. .................................... 123/550; 123/556; 432/222
[58] Field of Search ...................... 123/550, 551, 556; 432/222; 431/236, 237

[56] References Cited

U.S. PATENT DOCUMENTS 3,586,300 6/1971 Monroe .............................. 432/222
3,630,183 12/1971 Hoffman ............................ 123/550
3,687,122 8/1972 Kamo ................................ 123/550
3,881,863 5/1975 Creuz ................................ 432/222
4,027,642 6/1977 Kamada ............................ 123/550

*Primary Examiner*—Ronald H. Lazarus
*Attorney, Agent, or Firm*—Craig & Burns

[57] ABSTRACT

A heating arrangement for preheating combustion air flowing through an intake manifold of an internal combustion engine, the heating arrangement including a pot-shaped housing forming a combustion chamber into which an ignition device and a fuel injection nozzle project. A shut off valve controls an inflow of fuel and a shield sheet serves to shield the combustion flame. The pot-shaped housing is located in a flow path of the combustion air and is covered on its open side by a holder. The holder is fastened to the intake manifold and supports the ignition device, fuel injection nozzle, and shut off valve. The housing includes openings in an upstream wall portion from which the shield sheet projects into the housing in a vicinity of the opening in such a way that the shield sheet separates the combustion chamber from the fuel injection nozzle chamber.

29 Claims, 11 Drawing Figures

HEATING DEVICE FOR PREHEATING COMBUSTION AIR FOR AN INTERNAL COMBUSTION ENGINE

The present invention relates to a heating device and, more particularly, to a heating device for preheating combustion air flowing through an intake manifold of an internal combustion engine, which includes a pot-shaped housing forming a combustion chamber into which an ignition device and fuel injection nozzle project, with shut off valve means being provided for controlling an inflow of fuel and a shield sheet serving to shield the flame.

In order to improve cold starting of an internal combustion engine, especially a direct fuel injected internal combustion engine, as well as for facilitating a running of the internal combustion engine when the engine is warm, several heating devices have been proposed.

In, for example, German Pat. No. 1,260,862, a heating device for an internal combustion engine is proposed wherein a combustion chamber, which is open to the intake manifold, is disposed externally on the intake manifold with a deflecting sheet or shielding sheet provided with holes, extending diagonally into the intake manifold.

The aim underlying the present invention essentially resides in providing a heating device for preheating combustion air for internal combustion engine which ensures a complete combustion without a formation of bluish-white smoke and thereby ensures a trouble-free operation of the engine from the time the starting begins until a temperature of the coolant is reached which is favorable for the operating process of the engine.

In accordance with advantageous features of the present invention, the pot-shaped housing is located in a flow path of the combustion air covered on an open side by a holder which is fastened to an intake manifold. The pot-shaped housing supports an ignition device, fuel injection nozzle, and shut-off valve. The housing includes openings in an upstream wall part from which a shield sheet projects into the housing in a vicinity of an opening in such a manner that it separates a combustion chamber and nozzle chamber from one another.

As a result of the separation achieved by the above-noted features of the present invention, the fuel injection nozzle is protected against soot deposits and excessive heat radiation resulting from the flame of the ignition device. Moreover, a limited heating of the holder makes an additional heat insulation for the shut-off valve superflous.

A further advantage of the above noted features of the present invention resides in the fact that by virtue of the disposition of the shut-off valve on the holder, aside from achieving a compact design, a small fuel volume is present between the fuel injection nozzle and the shut off valve thereby preventing fuel from continuing to drip.

Advantageously, the opening in the shield or deflecting sheet is rectangular, with an upper edge of the opening, extending crosswise in the intake manifold, being arranged flush with an inside contour of the intake manifold. Lateral edges of the opening include slots in which the lower sheet part of the step-shaped shield sheet is fixed and so placed that an upper inlet opening for the nozzle chamber and lower intlet opening for the combustion chamber result.

According to the present invention, the upper sheet part of the shield sheet may be provided with only one hole for accommodating a spray cone of the fuel injection nozzle, whereby a slot is formed between the fuel injection nozzle and the upper sheet part of the shield sheet.

With the constructional features of the present invention not only does the fuel injection nozzle not become contaminated with soot, the nozzle is also adequately vented by the incoming air so as to preclude the nozzle from becomming too warm.

In order to prevent a cooling of the combustion chamber wall in a part of the combustion chamber which is located further upstream, a cylinder wall of the housing has a curved indentation between a lower sheet part of the shield sheet and the bottom of the housing. This shape ensures that the temperature rapidly rises to more than 500° C. in this area as the rotational speed of the engine increases. This is advantageous since the free combustion limit for soot is approximately 500° C.

In accordance with still further features of the present invention, the bottom of the housing may include an increasing depression starting at the center or middle and running upstream from the center, with a slot-shaped opening being formed between a lower edge of the indentation and a forward edge of the bottom of the housing, whereby the forward edge is shaped to conform to the shape of the indentation. The slot-shaped opening is employed to supply fresh air at low dynamic pressure and, when the dynamic pressure is high, which may result at medium rotational speeds of the engine, the flame escapes from the slot-shaped opening and intensively heats the bottom of the combustion chamber.

By virtue of this arrangement, soot particles which have collected in the combustion chamber when the engine is operating in a low rotational speed range are completely burnt.

Furthermore, according to the present invention, gill-shaped openings are disposed symmetrically to the left and right of the indentation with the openings extending approximately over an entire length of the housing up to a point which is a short distance from a bottom of the housing. The openings may be formed by indented rectangular guide sheets, of which each bottom edge runs in the flow direction of the combustion air and each adjacent edge runs parallel to a lengthwise axis of the housing, with these edges lying in a plane which runs through the lengthwise axis of the housing.

Advantageously, the arrangement of the lateral openings deflect the flame in the combustion chamber through 180° and a portion of the flame heats up the combustion chamber from behind. The guide sheets, cut into the bottom of the combustion chamber, result in the formation of a certain degree of heat stagnation at low rotational speeds of the engine. The flame is able to better escape from the openings when the dynamic pressure is increased.

Both edges of each guide sheet may, in accordance with the present invention, be connected together by a curved edge, with an uppermost part of each guide sheet forming a curve which merges with an outside contour of the housing.

The ignition device may advantageously consist of a glow plug located downstream behind the fuel injection nozzle with a longitudinal center axis of the glow plug and a longitudinal axis of the housing intersecting within the housing in a vicinity of the ignition stream or spray cone.

The middle sheet part of the heating device of the present invention may run diagonally upward with respect to the upper sheet part of the shield sheet beginning at the lower sheet part of the shield sheet.

According to the present invention, the upper sheet part of the shield sheet covers the combustion chamber and includes a further hole for accommodating the glow plug, with an edge of the hole and the glow plug forming a small annular slot.

A middle sheet part of the shield sheet may be perforated and, the upper sheet part of the shield sheet may be bent upward at right angles to the holder a short distance behind the fuel injection nozzle.

A pot-shaped insert with a perforated cylinder wall and a closed bottom is disposed in the pot-shaped housing of the heating device of the present invention beneath the shield sheet which is formed by the holder.

The ignition device, formed as a glow plug, projects into the pot-shaped insert in such a manner that its longitudinal center axis and longitudinal center axis of the fuel injection nozzle intersect in a lower part of the pot-shaped insert.

Advantageously, the pot-shaped insert may be so mounted on the shield sheet that it covers the open side of the insert for about one-third of its length and, an annular space may be formed between the pot-shaped insert and the housing.

Accordingly, it is an object of the present invention to provide a heating device for preheating combustion air for an internal combustion engine which avoids, by simple means, shortcomings and disadvantages encountered in the prior art.

Another object of the present invention resides in providing a heating device for preheating combustion air for an internal combustion engine which ensures a complete combustion process in the engine.

Yet another object of the present invention resides in providing a heating device for preheating combustion air for a direct fuel injected engine which improves the cold starting ability of the engine.

A still further object of the present invention resides in providing a heating device for preheating combustion air for an internal combustion engine which is simple in construction and therefore relatively inexpensive to manufacture.

These and other objects, features, and advantages of the present invention will become more apparent from the following description when taken in connection with the accompanying drawings which show, for the purposes of illustration only, several embodiments in accordance with the present invention, and wherein.

Figure 1:
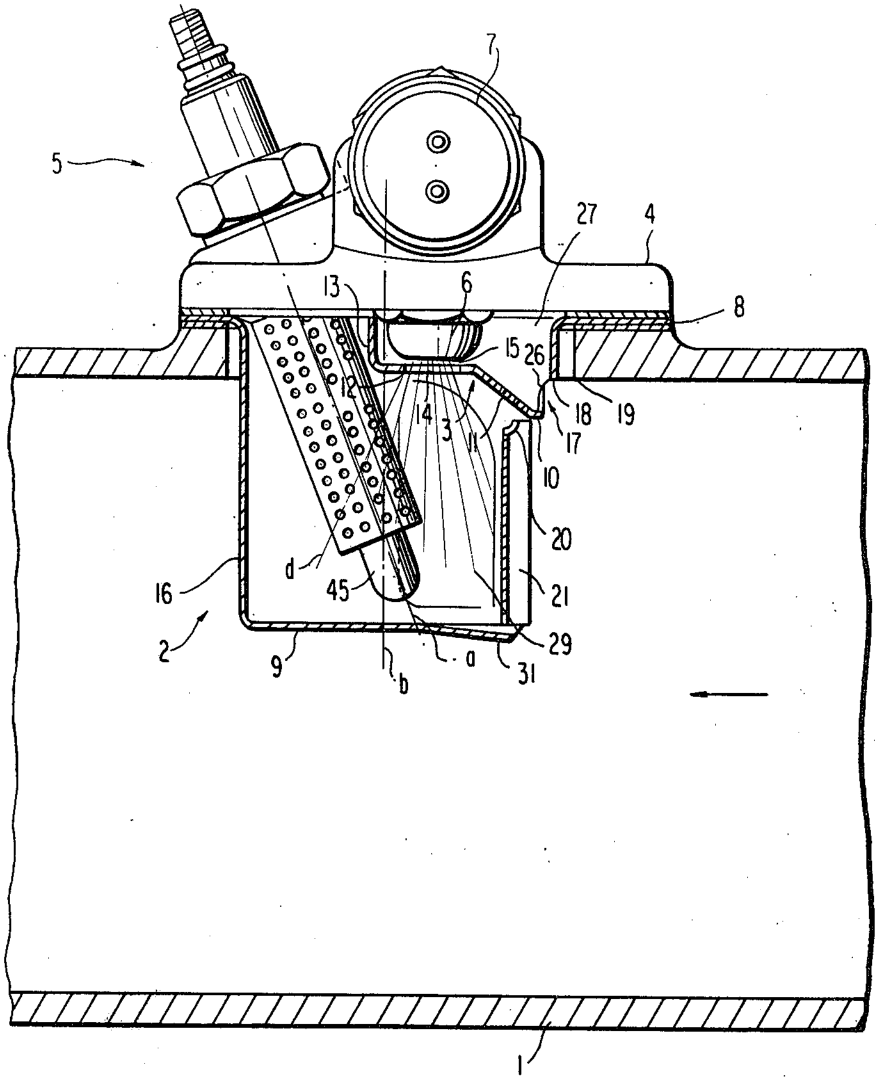
FIG. 1 is a partial cross sectional view of an intake manifold of an internal combustion engine having a heating device constructed in accordance with the present invention arranged therein.

Referring now to the drawings wherein like reference numerals are used throughout the various views to designate like parts and, more particularly, to FIG. 1, according to this figure, a pot-shaped combustion chamber housing generally designated by the reference numeral 2 projects into an intake manifold 1 of a direct-injected internal combustion engine. The pot shaped combustion chamber housing 2 is made of sheet metal and extends approximately up to a center of the intake manifold 1, with a housing 2 being provided with a built-in shield sheet generally designated by the reference numeral 3.

The housing 2 is covered on an upper open side by a holder 4 with the holder 4 mounting an ignition device generally designated by the reference numeral 5 formed as, for example, a glow plug, a fuel injection nozzle 6 fashioned as, for example, a mechanical atomizer nozzle 6, and a shut off valve 7, connected with the nozzle 6. The holder 4, ignition device 5, injection nozzle 6, and shut-off valve 7 are assembled to form a module thereby enabling the holder 4 to be threadably fastened or secured to the intake manifold 1, with a flange 8 of the combustion chamber housing 2 being interposed between the holder 4 and an outer surface of the intake manifold 1.

The glow plug 5 is disposed downstream from the atomizer nozzle 6 and projects diagonally into the combustion chamber housing 2 in such a manner that a longitudinal axis a of the ignition device 5 and a longitudinal axis b of the combustion chamber housing 2 intersect within the housing 2. The ignition device 5 terminates at a short distance above a bottom portion 9 of the combustion chamber housing 2.

The shield sheet 3 is constructed with a plurality of bends so as to form a horizontal lower sheet part 10, a middle inclined sheet part 11 which extends diagonally upward, a horizontal upper sheet part 12, and a final sheet part 13 disposed at right angles to the sheet part 12. The middle sheet part 11 is perforated and is adjacent to the lower sheet part 10 from which the middle sheet part 11 extends diagonally upward. The final sheet part 13 is arranged so as to abut the holder 4.

A hole or opening 14 is provided in the upper sheet part at a position opposite the injection nozzle 6, with the hole 14 having a diameter which is slightly larger than a diameter d of the injection nozzle 6 located at this point. Only a small gap 15 is provided between the sheet part 12 and the injection nozzle 6.

A cylinder wall 16 of the combustion chamber housing 2 has a rectangular opening 17 located upstream and extending diagonally into the intake manifold. The rectangular opening 17 includes an upper edge 18 arranged so as to be flush with an inside contour or surface 19 of the intake manifold 1.

Figure 2:
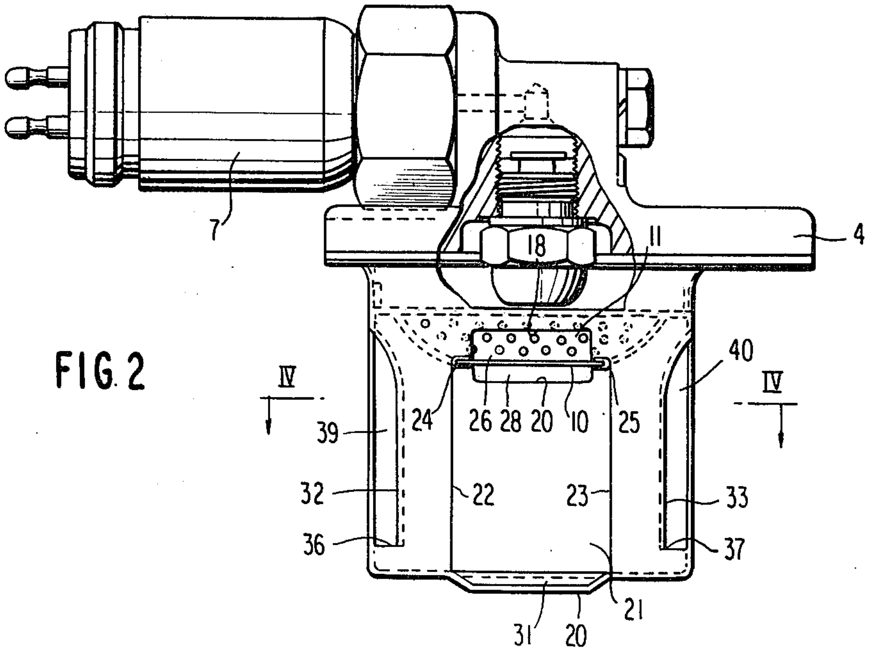
FIG. 2 is a partial cut-away front elevational view of the heating device of FIG. 1.
Figure 3:
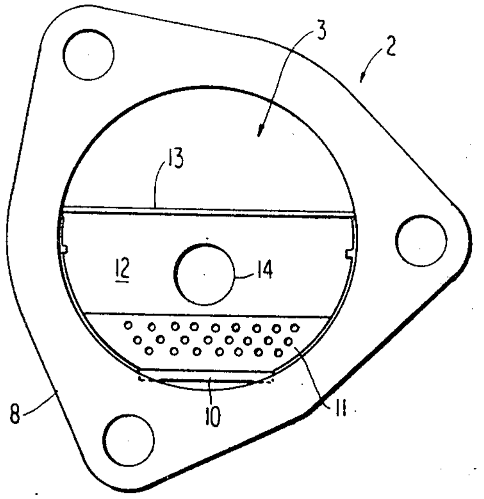
FIG. 3 is a top view of a combustion chamber housing with a perforated shield sheet of the heating device constructed in accordance with the present invention.

As shown most clearly in FIG. 2, a curved indentation 21 is provided in the cylinder wall 16, with the indentation 21 extending from a lower edge 20 up to the bottom portion 9 of the combustion chamber housing 2. A radius and a depth of the bulge of the indentation 21 are selected so that lateral limits 22, 23 of the identation 21 act as separation edges for the air flow. The opening 17 includes slots 24, 25 on the both sides thereof, with the lower sheet part 10 of the shield sheet 3 projecting into the slots 24, 25.

As shown in FIGS. 1 and 2, a fastening of shield sheet 3 produces two openings, namely, an upper inlet opening 26 intended for a nozzle chamber 27 and a lower opening 28 intended for a combustion chamber 29. The nozzle chamber 27 and combustion chamber 29 are thus separated from one another by the shield sheet 3.

The bottom portion 9 of the combustion chamber housing 2 is provided with an increasing depression or indentation 30 which extends from a center of the bottom up to the indentation 21. The depression 30 defines a slot-shaped opening 31 at a lower edge of the indentation 21.

Figure 4:
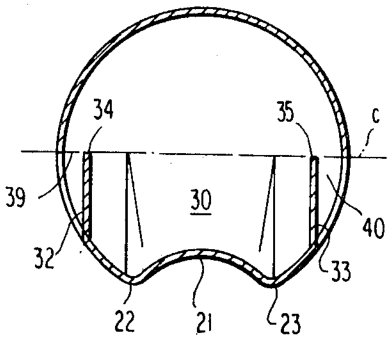
FIG. 4 is a partial cross sectional view taken along the lines IV—IV in FIG. 2.
Figure 5:
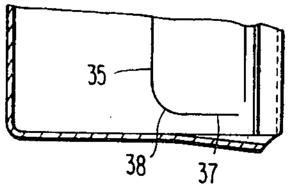
FIG. 5 is a partial cross sectional cut-away view of a gill-shaped guide sheet with a rounded corner in a cylinder wall of a pot-shaped combustion chamber housing of a heating device of the present invention.

As shown in FIGS. 2 and 4, two indented flat guide sheets 32, 33 are located to a left and right of the indentation 21, with vertical edges 34, 35 of the sheets 32, 33 lying in a plane c which passes through the longitudinal axis b of the combustion chamber housing 2. Horizontal edges 36, 37 which run or are disposed a short distance above the bottom portion 9 of the combustion chamber housing 2 are connected by curved edges 38 (FIG. 5) with edges 34 and 35.

The guide sheets 32, 33 are pressed into the combustion chamber housing 2 in such a way that they extend parallel to one another. The guide sheets 32, 33 are flat; however, as shown in FIG. 2, the guide sheets 32, 33 are curved in an upper part up to an outer contour of the cylinder wall. Gill-shaped openings 39, 40 result from the guide sheets 32, 33 projecting into the combustion chamber 29.

Figure 6:
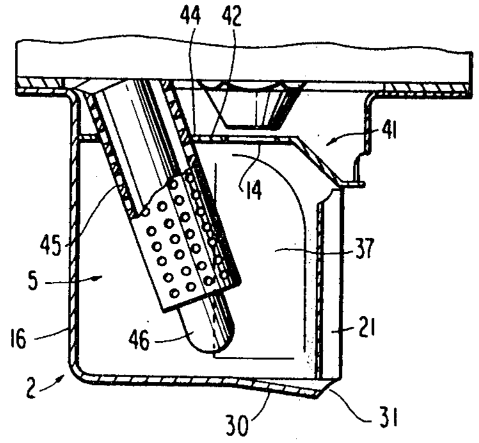
FIG. 6 is a partial cross sectional view of a two-step construction for a non-perforated shield sheet for a combustion chamber housing of a heating device constructed in accordance with the present invention and illustrating a position of a glow plug and fuel injection nozzle.
Figure 7:
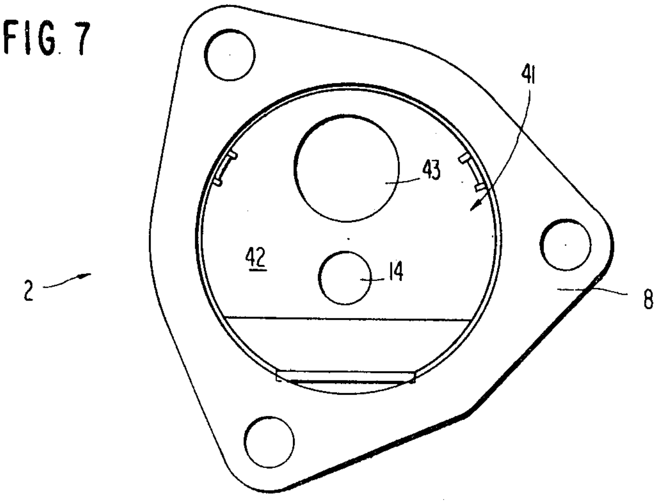
FIG. 7 is a top view of the shield sheet of FIG. 6.
Figure 8:
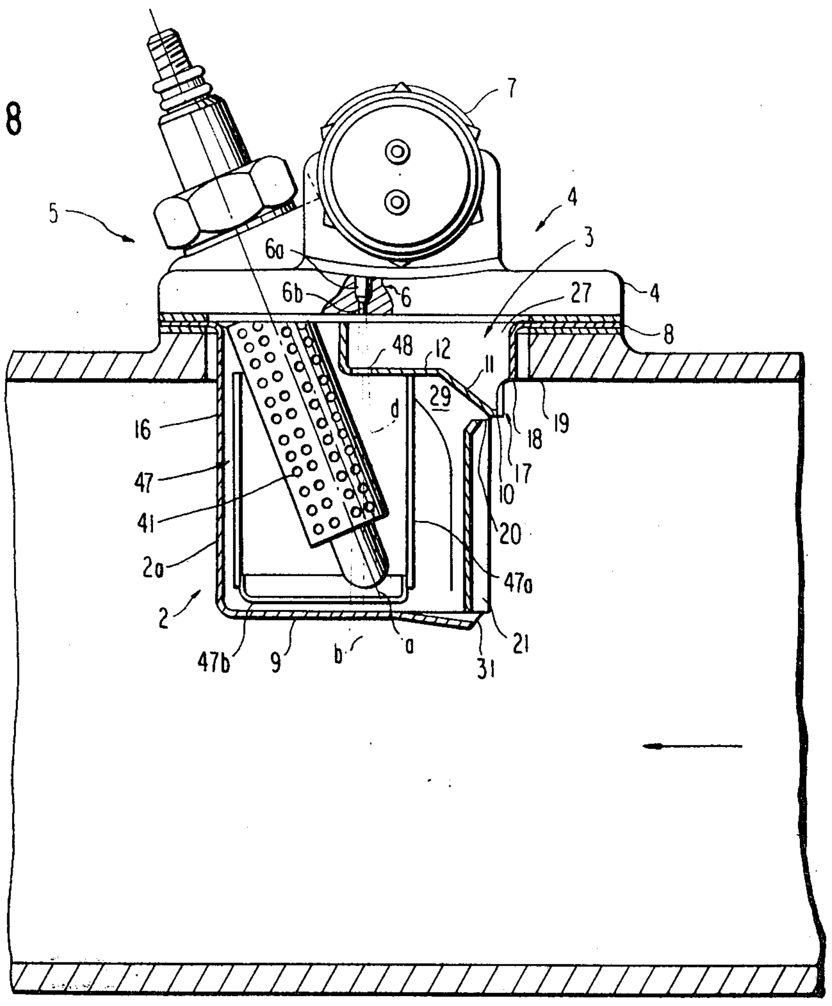
FIG. 8 is a partial cross sectional view of an intake manifold of an internal combustion engine having another embodiment of a heating device constructed in accordance with the present invention with an insert in the pot-shaped housing.
Figure 9:
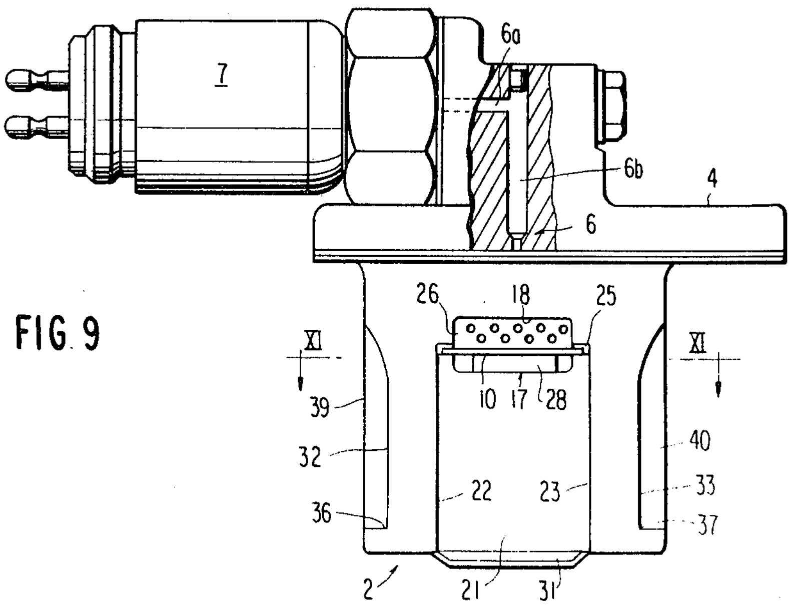
FIG. 9 is a front elevation view of the heating device of FIG. 8.
Figure 10:
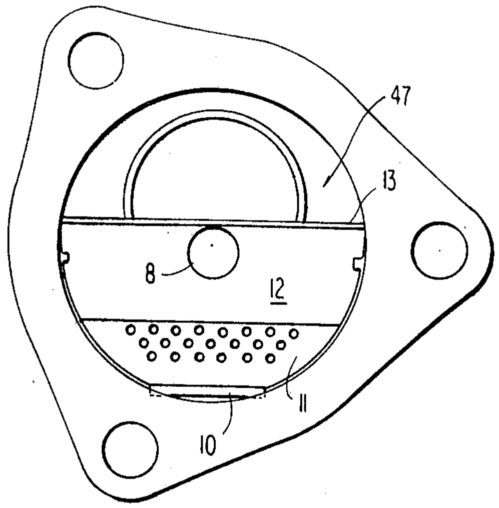
FIG. 10 is a top view of the housing of the heating device of FIG. 8.
Figure 11:
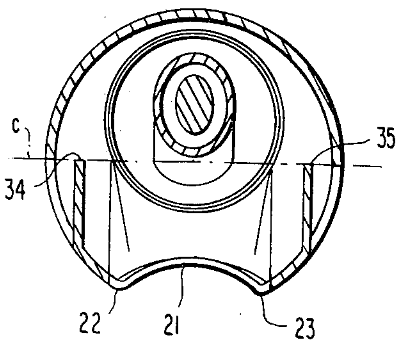
FIG. 11 is a cross sectional view taken along the line XI—XI in FIG. 9.

In lieu of a shield sheet 3 of the construction of FIGS. 1–4, as shown in FIGS. 6 and 7, a cover part generally designated by the reference numeral 41 may be provided, with the cover part 41 having an upper sheet part 42 which extends downstream to an inner contour of the cylinder wall 16 of the combustion chamber housing 2. In addition to a hole 14 for the injection nozzle 6, the cover plate 41 may, as shown in FIG. 7, be provided with another hole or opening 43 for accommodating the ignition devide 5. The size of the hole 43 is selected so that only a small annular slot 44 is produced between the perforated shield 45 that surrounds the injection device 5 and an edge of the hole 43.

The heating device of the construction of FIGS. 6 and 7 operates in the following manner:

Fuel is drawn from a fuel system and atomized by the mechanical atomizing nozzle 6, with portions of the fuel wetting the perforated shield 45 of the glow plug 5, upon which the fuel evaporates. A mixture capable of igniting is formed with the ambient air in a space between the glow shaft or glow rod 46 of the glow plug 5 and the perforated shield 45, with the mixture being ignited by the glow rod 46 and, in turn, igniting the mixture in the combustion chamber.

A small portion of the combustion air drawn in is burnt or combusted; however, since the diesel engine can operate with excess air, engine operation is not disturbed thereby.

By virtue of the constructional features of the injection nozzle 6, it is possible first to achieve optimum atomization with the available fuel pressure and, secondly, it is possible for the spray cone to cover a large area of the combustion chamber 29. Moreover, as the fuel evaporates in the hot zones of the combustion chamber 29 heat is drawn from a material thereby preventing overheating and damage to the material of the combustion chamber housing 2.

With a heating device such as proposed by the present invention, it is possible to decrease the starting limit temperatures to a −40° C., with a much reduced starting time, a rapid rotation of the engine, and immediate gas intake, as well as a considerable reduction in the formation of bluish-white smoke during further combustion following the start of the engine, until a cooling water temperature is reached which is favorable for the overall working or combustion process of the engine.

FIGS. 8–11 provide an example of another embodiment of a heating device constructed in accordance with the present invention and, according to these figures, the holder 4, covering a combustion chamber housing on an upper open side thereof, contains a fuel injection nozzle 6, formed by the holder itself, a channel **6*a*, and a metering bore 6*b* adjacent the metering channel 6*a*. The holder 4, ignition devide 5, and shut off valve 7 are assembled so as to form a module, with the holder 4 adapted to be threadably secured to the intake manifold 1 by a flange 8 of the combustion chamber housing 2**.

A pot-shaped insert 47 is located in the pot-shaped combustion chamber housing 2, with the insert 47 including a cylindrical wall **47*a*, which is perforated and includes a lower bottom portion 47*b* having no openings or perforations. The insert 47 and combustion chamber housing 2** are disposed so as to form an annular intermediate space.

The ignition device 5 in the form of, for example, a glow plug, is located downstream of the metering bore **6*b* and projects diagonally into the insert 47 in such a manner that a longitudinal axis a of the ignition device 5 and a longitudinal axis b of the metering bore 6*b* intersect within the pot-shaped insert 47 in the vicinity of the closed bottom 47*b*. The bottom 47*b* is disposed at a short distance above a bottom portion 9 of the housing 2**.

The insert 47 is connected by welded seams with the sheet part 12 of the shield sheet 3, with the sheet 3 covering an open side of the insert 47 for about one-third of its length. A hole 47 is disposed opposite the nozzle 6 in the upper sheet part 12, with the hole 48 being slightly larger than a diameter of the spray cone d at this point. The longitudinal axis b of the housing 2 corresponds or is coincident with the longitudinal axis b of the metering bore **6*b***.

The heating device of the construction in FIGS. 8–11 functions in the following manner.

Fuel is drawn from a fuel system through the channel **6*a* and sprayed into the metering bore 6*b***, with the usual normal pressure in the system being sufficient in contrast with a construction utilizing a mechanical atmoizer nozzle, the fuel pressure need not be increased.

The fuel injected into the insert 47 strikes the perforated shield 41 surrounding the ignition device 5, with a portion of the fuel evaporating and forming a mixture capable of igniting in the ambient air. The mixture is ignited by a glowing rod 42 of the ignition device 5. Most of the fuel drips off the shield 41 of beads on the rod 42 of the ignition device 5 and reaches the bottom 47*b*. After the fuel is ignited, the ensuing flame envelopes the cylinder wall 47*a* and bottom 47*b* so that the fuel which is trapped by the bottom 47*b* is continuously evaporated.

The air flowing through the perforations in the cylinder wall 47*a* mixes with the rising fuel mist to form a combustible mixture of gases which continuously burns. The gas mixture inside and outside of the cylinder wall 47*a* is favored by the vortex prevailing in the combustion chamber.

The size, number, and arrangement of the holes in the cylinder wall 47*a* are selected so that even in unfavorable operating conditions, sufficient air can flow into the interior area defined by the cylinder wall 47*a*.

The above noted properties of the heating device of the present invention ensure good combustion, and soot deposits inside and outside of the combustion chamber are thereby avoided. Since the flame may propagate in an unimpeded fashion in the combustion chamber, when it escapes from the combustion chamber, the entire gill cross section is touched by the flame. A spot heating of parts of the combustion chamber, which could cause an overheating and damage to the material, is thereby avoided.

As can readily be appreciated, the ignition device 5 may also be a spark plug rather than a glow plug and nevertheless permit realiable soot-free operation by virtue of the special construction of the combustion chamber housing 2.

While we have shown and described only two embodiments in accordance with the present invention, it is understood that the same is not limited thereto but is susceptible of numerous changes and modifications as known to one having ordinary skill in the art and we therefore do not wish to be limited to the details shown and described herein, but intend to cover all such modifications as are encompassed by the scope of the appended claims.

We claim:

1. A heating means for preheating combustion air flowing through an intake manifold of an internal combustion engine, the heating means including housing means for forming a combustion chamber means, an ignition means projecting into the housing means, a fuel injection nozzle means projecting into the housing means, a valve means for controlling a supply of fuel to the fuel injection nozzle means, and a shield means for shielding a combustion flame from the injection means, characterized in that the housing means is located in a flow path of the combustion air, holder means are provided for covering an open side of the housing means and for supporting and fastening the ignition means, the fuel injection nozzle means, and valve means to the intake manifold, the housing means includes a wall with an upstream wall portion having at least one opening therein, the shield means projects into the housing means in a vicinity of the opening in such a manner so as to separate the combustion chamber means from a fuel injection nozzle chamber means.

2. A heating means according to claim 1, characterized in that the housing means is pot-shaped, the at least one opening is rectangular and includes an upper edge extending crosswise in the intake manifold, the upper edge is flush with an inside contour of the intake manifold, the shield means is formed as a stepped sheet and includes a lower sheet portion, and in that lateral edges of the opening define slot means for accommodating the lower sheet part such that the lower sheet part is mounted and disposed to define an upper inlet opening for the nozzle chamber means and a lower inlet opening for the combustion chamber means.

3. A heating means according to claim 2, characterized in that the shield means includes an upper sheet portion, an opening is provided in the upper sheet portion at a position opposite to the fuel injection nozzle means for enabling the nozzle means to spray fuel into the combustion chamber means, a slot is formed between the fuel injection nozzle means and the upper sheet portion of the shield means.

4. A heating means according to one of claims 1, 2, or 3, characterized in that the housing means is cylindrical and in that means are provided in a wall of the housing means for forming air flow separation edges.

5. A heating means according to claim 4, characterized in that the means for forming air flow separation edges includes a curved indentation arranged between the lower sheet portion and a bottom portion of the housing means.

6. A heating means according to claim 5, characterized in that the bottom portion of the housing means includes an increasing depression running upstream from a middle of the bottom portion, said depression forming a slot-shaped opening between a lower edge of the indentation and a forward edge of the bottom portion of the housing means, and in that the forward edge of the bottom portion is shaped to conform to a shape of the indentation.

7. A heating means according to claim 6, characterized in that gill-shaped openings are disposed symmetrically to a left and a right of the indentation, said gill-shaped openings extending approximately over an entire length of the housing means up to a short distance from the bottom portion of the housing means.

8. A heating means according to claim 7, characterized in that the gill-shaped openings are formed by indented rectangular guide sheets, each of the guide sheets includes a bottom edge extending in a flow direction of the combustion air and a further edge extending parallel to a longitudinal axis of the housing means, and in that the further edges are disposed in a plane extending through a longitudinal axis of the housing means.

9. A heating means according to claim 7, characterized in that a curved edge means is provided for connecting both bottom edges of the guide sheets to each other, and in that an uppermost portion of each guide sheet forms a curve which merges with an outside contour of the housing means.

10. A heating means according to claim 9, characterized in that the ignition means includes a glow plug located downstream of the fuel injection nozzle, and in that a longitudinal axis of said glow plug and a longitudinal axis of the housing means intersect within the housing means in a vicinity of a spray cone of the fuel injection nozzle means.

11. A heating means according to claim 10, characterized in that the shield means includes a middle sheet portion extending diagonally upwardly between the upper sheet portion and the lower sheet portion.

12. A heating means according to claim 11, characterized in that the middle sheet portion is perforated, and in that the upper sheet portion is bent upward at right angles to the holder means a short distance behind the fuel injection nozzle means.

13. A heating means according to one of claims 1 or 2, characterized in that the shield means includes an upper sheet portion for covering the combustion chamber means, a first opening is provided in the upper sheet portion at a position opposite the fuel injection nozzle means for enabling the nozzle means to spray fuel into the combustion chamber means, a further opening is provided in the upper sheet portion for accommodating the ignition means, and in that the further opening is dimensioned such that a small annular slot is formed between the ignition means and an edge of the further opening.

14. A heating means according to claim 13, characterized in that the housing means is cylindrical and in that means are provided in a wall of the housing means for forming air flow separation edges.

15. A heating means according to claim 14, characterized in that the means for forming air flow separation edges includes a curved indentation arranged between the lower sheet portion and a bottom portion of the housing means.

16. A heating means according to claim 15, characterized in that the bottom portion of the housing means includes an increasing depression running upstream from a middle of the bottom portion, said depression forming a slot-shaped opening between a lower edge of the indentation and a forward edge of the bottom portion of the housing means, and in that the forward edge of the bottom portion is shaped to conform to a shape of the indentation.

17. A heating means according to claim 16, characterized in that gill-shaped openings are disposed symmetrically to a left and a right of the indentation, said gill-shaped openings extending approximately over an entire length of the housing means up to a short distance from the bottom portion of the housing means.

18. A heating means according to claim 17, characterized in that the gill-shaped openings are formed by indented rectangular guide sheets, each of the guide sheets includes a bottom edge extending in a flow direction of the combustion air and a further edge extending parallel to a longitudinal axis of the housing means, and in that the further edges are disposed in a plane extending through a longitudinal axis of the housing means.

19. A heating means according to claim 18, characterized in that a curved edge means is provided for connecting both bottom edges of the guide sheets to each other, and in that an uppermost portion of each guide sheet forms a curve which merges with an outside contour of the housing means.

20. A heating means according to claim 19, characterized in that the ignition means includes a glow plug located downstream of the fuel injection nozzle, and in that a longitudinal axis of said glow plug and a longitudinal axis of the housing means intersect within the housing means in a vicinity of a spray cone of the fuel injection nozzle means.

21. A heating means according to claim 20, characterized in that the shield means includes a middle portion interposed between the lower sheet portion and the upper sheet portion, and in that the middle sheet portion is perforated.

22. A heating means according to one of claims 1 or 2, characterized in that a pot-shaped insert means having a closed bottom and an open end is disposed in the housing means at a position beneath the shield means, the insert means includes a perforated cylindrical wall, and in that the fuel injection nozzle means is formed by the holder means.

23. A heating means according to claim 22, characterized in that the ignition means includes a glow plug projecting into the pot-shaped insert means in such a manner that a longitudinal axis of the ignition means and a longitudinal axis of the fuel injection nozzle means intersect in a lower portion of the insert means.

24. A heating means according to claim 23, characterized in that the insert means is mounted on the shield means in such a manner that the shield means covers the open side of the insert means for about one-third of its length.

25. A heating means according to claim 24, characterized in that an annular space is formed between the insert means and the housing means.

26. A heating means according to claim 25, characterized in that the shield means includes an upper sheet portion and a middle sheet portion extending between the upper sheet portion and the lower sheet portion, and in that the middle sheet portion is perforated.

27. A heating means according to claim 26, characterized in that the upper sheet portion is bent upward at right angles to the holder means a short distance behind the fuel injection nozzle means.

28. A heating means according to one of claims 1, 2, or 3, characterized in that the ignition means includes a glow plug located downstream of the fuel injection nozzle, and in that a longitudinal axis of said glow plug and a longitudinal axis of the housing means intersect within the housing means in a vicinity of a spray cone of the fuel injection nozzle means.

29. A heating means according to one of claims 1 or 2, characterized in that the shield means includes an upper sheet portion for covering the combustion chamber means, an opening is provided in the upper sheet portion in a position opposite the fuel injection nozzle means for enabling the nozzle means to spray fuel into the combustion chamber means, a slot portion is formed between the fuel injection nozzle means and the upper sheet portion, a further opening is provided in the upper sheet portion for accommodating the ignition means, and in that the further opening is dimensioned such that a small annular slot is formed between the ignition means and an edge of the further opening.

* * * * *